US009475588B2

(12) United States Patent
Westerlund (10) Patent No.: US 9,475,588 B2
(45) Date of Patent: Oct. 25, 2016

(54) STEERING METHOD FOR TAXIING AIRCRAFT

(75) Inventor: Gary L. Westerlund, Kent, WA (US)

(73) Assignee: The Boeing Company, Chicago, IL (US)

( * ) Notice: Subject to any disclaimer, the term of this patent is extended or adjusted under 35 U.S.C. 154(b) by 1213 days.

(21) Appl. No.: 12/967,883

(22) Filed: Dec. 14, 2010

(65) Prior Publication Data

US 2012/0145823 A1    Jun. 14, 2012

(51) Int. Cl.

| G01C 23/00 | (2006.01) |
|---|---|
| B64F 1/00 | (2006.01) |
| G08G 5/06 | (2006.01) |
| G05D 1/00 | (2006.01) |

(52) U.S. Cl.
CPC ............. *B64F 1/002* (2013.01); *G05D 1/0083* (2013.01); *G08G 5/065* (2013.01)

(58) Field of Classification Search
CPC ........ B64C 25/50; B64C 1/002; G05D 1/02; G05D 1/0083; G05D 5/065
USPC ........ 244/102, 100 R, 102 R, 103 R, 50, 51; 701/3
See application file for complete search history.

(56) References Cited

U.S. PATENT DOCUMENTS

| 3,757,887 | A * | 9/1973 | Moore et al. ................. 180/168 |
|---|---|---|---|
| 5,513,821 | A | 5/1996 | Ralph |
| 5,991,427 | A * | 11/1999 | Kakinami et al. ............ 382/104 |
| 6,405,975 | B1 | 6/2002 | Sankrithi et al. |
| 6,411,890 | B1 * | 6/2002 | Zimmerman ................. 701/120 |
| 6,690,295 | B1 * | 2/2004 | De Boer ........................ 340/951 |
| 6,722,610 | B1 * | 4/2004 | Rawdon et al. ......... 244/103 W |
| 6,751,545 | B2 * | 6/2004 | Walter .......................... 701/120 |
| 6,928,363 | B2 | 8/2005 | Sankrithi |
| 7,382,284 | B1 * | 6/2008 | Armstrong et al. .......... 340/958 |
| 7,592,929 | B2 * | 9/2009 | Pepitone ....................... 340/945 |
| 7,623,044 | B2 * | 11/2009 | Pepitone et al. ............. 340/950 |
| 7,891,609 | B2 * | 2/2011 | Cox et al. ..................... 244/121 |
| 7,967,247 | B2 * | 6/2011 | Bellouard et al. ............ 244/111 |
| 7,983,804 | B2 * | 7/2011 | Cox et al. ......................... 701/3 |
| 8,022,978 | B2 * | 9/2011 | Konya .......................... 348/113 |
| 8,026,833 | B2 * | 9/2011 | Villaume et al. ............. 340/961 |
| 8,046,165 | B2 * | 10/2011 | Sacle et al. ................. 701/33.4 |
| 8,094,042 | B2 * | 1/2012 | Read et al. ................... 340/960 |
| 8,125,352 | B2 * | 2/2012 | Dubourg et al. ............. 340/980 |

(Continued)

OTHER PUBLICATIONS

Kelly et al., An Approach to Rough Terrain Autonomous Mobility, presented at the 1997 International Conference on Mobile Planetary Robots, Santa Monica, California, Jan. 1997, (34 pgs).

(Continued)

*Primary Examiner* — Brian M O'Hara
*Assistant Examiner* — Assres H Woldemaryam
(74) *Attorney, Agent, or Firm* — Toler Law Group, P.C.

(57) ABSTRACT

Methods, non-transitory computer readable media, and aircraft for aircraft taxiing are provided. A particular method determines a location of an aircraft relative to a taxiway having a curved section. The method determines a first nose gear steering angle to steer the aircraft through at least a first portion of the curved section. The first nose gear steering angle is selected to cause nose gear of the aircraft to depart a taxiway centerline. The first nose gear steering angle is selected to keep a steering point of the aircraft substantially over the taxiway centerline as the aircraft traverses at least the first portion of the curved section. The steering point is located between the nose gear and main gear of the aircraft.

15 Claims, 8 Drawing Sheets

(56) References Cited

U.S. PATENT DOCUMENTS

| | | | |
|---|---|---|---|
| 2004/0056952 A1* | 3/2004 | Konya | 348/117 |
| 2004/0059497 A1* | 3/2004 | Sankrithi | 701/120 |
| 2007/0168111 A1* | 7/2007 | Dubourg | 701/120 |
| 2008/0191903 A1* | 8/2008 | Dubourg et al. | 340/958 |
| 2009/0018713 A1* | 1/2009 | Coulmeau et al. | 701/3 |
| 2009/0040072 A1* | 2/2009 | Read et al. | 340/960 |
| 2009/0150009 A1* | 6/2009 | Villaume et al. | 701/3 |
| 2009/0150010 A1* | 6/2009 | Villaume et al. | 701/3 |
| 2010/0039295 A1* | 2/2010 | Dubourg et al. | 340/980 |
| 2012/0158218 A1* | 6/2012 | Funabiki et al. | 701/3 |

OTHER PUBLICATIONS

Omead Amidi, Integrated Mobile Robot Control, The Robotics Institute, Carnegie Mellon University, May 1990, Pittsburgh, Pennsylvania, (39 pgs).

Kuwata et al., Motion Planning in Complex Environments using Closed-loop Prediction, Massachusetts Institute of Technology, Cambridge, Massachusetts, 2007, (22 pgs).

Park et al., Performance and Lyapunov Stability of a Nonlinear Path-Following Guidance Method, Journal of Guidance, Control, and Dynamics, vol. 30, No. 6, Nov.-Dec. 2007, (11 pgs).

* cited by examiner

STEERING METHOD FOR TAXIING AIRCRAFT

FIELD OF THE DISCLOSURE

The present disclosure is generally related to aircraft taxiing.

BACKGROUND

A large commercial aircraft may have a long wheelbase. The wheelbase is a distance along a centerline of the aircraft between nose gear and main gear of the aircraft. The long wheelbase of the aircraft may make it difficult to keep the main landing gear on a surface of a taxiway while executing a turn.

Figure 1:
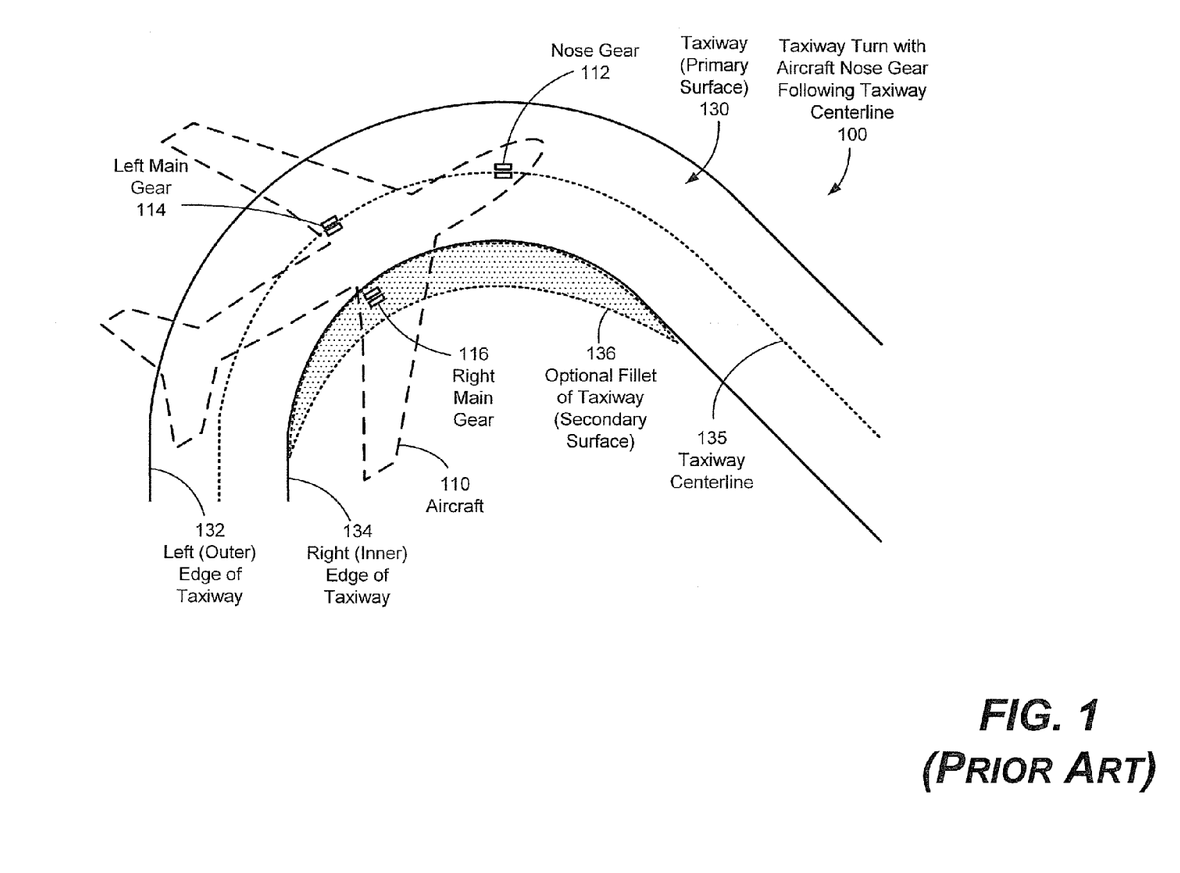
FIG. 1 (prior art) is a diagram depicting an aircraft traversing a taxiway turn where nose gear of the aircraft follows a taxiway centerline.

FIG. 1 is a prior art diagram depicting an aircraft 110 attempting to navigate a taxiway turn 100 with nose gear 112 of the aircraft 110 following a taxiway centerline 135. It may be desirable for gear 112, 114, and 116 of the aircraft 110 to remain on a surface of a taxiway 130 (i.e., between a left (outer) edge 132 of the taxiway 130 and a right (inner) edge 134 of the taxiway 130). However, when the nose gear 112 follows the taxiway centerline 135, the right main gear 116 may pass beyond the right (inner) edge 134 of the taxiway 130. The right main gear 116 may thus leave the surface of the taxiway 130. FIG. 1 shows that the taxiway 130 has been widened adjacent the right (inner) edge 134 of the taxiway 130 with an optional fillet 136. The optional fillet 136, if sufficiently wide, provides an additional paved surface to support the right main gear 116. Without the optional fillet 136, the right main gear 116 may leave the surface of the taxiway 130.

The nose gear 112 or the main gear 114 and 116 leaving the surface of the taxiway may create significant problems. For example, any of the gear 112, 114, and 116 leaving the surface of the taxiway 130 may jostle the aircraft 110 and cause injuries to passengers or damage to the aircraft 110 and its cargo. Further, if a shoulder of the taxiway 130 is soft, any of the gear 112, 114, and 116 rolling onto the shoulder may sink into the shoulder and the aircraft may become stuck. Because of these concerns, surfaces of some taxiways are widened at the turns (using fillets, such as the fillet 136) to try to maintain all the gear on the taxiway.

To keep the nose gear 112 and the main gear 114 and 116 on the taxiway 130, many operators "oversteer" the nose gear 112. Oversteering involves steering the nose gear 112 beyond a taxiway centerline 135 to try to ensure that the main gear on the inside of the turn (e.g., the right main gear 116 for a right-hand turn, as shown in FIG. 1) do not leave the surface of the taxiway 130. If the nose gear 112 is steered too far beyond the taxiway centerline 135, the nose gear 112 may roll off the surface of the taxiway 130. On the other hand, if the nose gear 112 is not steered far enough beyond the taxiway centerline 135, the right main gear 116 (for a right-hand turn, as shown in FIG. 1, or the left main gear 114 for a left-hand turn) may roll off the surface of the taxiway 130.

SUMMARY

Methods, non-transitory computer-readable storage media, and aircraft are disclosed to assist in steering aircraft on taxiways to prevent the nose gear and main gear from rolling off the surface of the taxiway during turns. To maintain the aircraft on the surface of the taxiway, a steering point is selected along an aircraft centerline. The steering point may be between a nose gear and a point at which an axis of main gear intersects a centerline of the aircraft. To maintain the aircraft on the surface of the taxiway, the nose gear is "oversteered" (i.e., steered outside of a taxiway centerline) so as to have the steering point follow a taxiway centerline. The steering point following the taxiway centerline enables the aircraft to complete the turn without any of the gear leaving the surface of the taxiway. Widening of the taxiway is not required.

The turn may be divided into segments. For each of the segments, a nose gear steering angle may be determined to maintain the steering point over the taxiway centerline. The determined nose gear steering angle may be used to automatically direct the nose gear. Alternatively, the nose gear steering angle may be presented to an operator to assist the operator in properly steering the nose gear.

In a particular embodiment, a method determines a location of an aircraft relative to a taxiway having a curved section. The method determines a first nose gear steering angle to steer the aircraft through at least a first portion of the curved section. The first nose gear steering angle is selected to cause nose gear of the aircraft to depart a taxiway centerline. The first nose gear steering angle is selected to keep a steering point of the aircraft substantially over the taxiway centerline as the aircraft traverses at least the first portion of the curved section. The steering point is located between the nose gear and main gear of the aircraft.

In another particular embodiment, a non-transitory computer-readable storage medium stores instructions executable by a processor. Based on a location of an aircraft relative to a taxiway having a curved section, the instructions executable by the processor automatically determine a first nose gear steering angle to steer the aircraft through at least a first portion of the curved section. The first nose gear steering angle is selected to cause nose gear of the aircraft to depart a taxiway centerline. The first nose gear steering angle is selected to keep a steering point of the aircraft substantially over the taxiway centerline as the aircraft traverses at least the first portion of the curved section. The instructions executable by the processor also generate a signal operable to enable the aircraft to be steered according to the first nose gear steering angle.

In another particular embodiment, an aircraft includes a fuselage having a centerline. Nose gear extends from the fuselage. The nose gear is steered to direct the aircraft along a portion of a taxiway that includes a curved section. Main gear also extend from the fuselage. A propulsion system is operative to power the aircraft to taxi along the taxiway. A nose gear steering system includes a processor, a receiver operably coupled to the processor and configured to receive a position signal, and a memory including instructions executable by the processor. The instructions in the memory determine a location of the aircraft relative to the taxiway based on the position signal. The instructions in the memory also determine a first nose gear steering angle to steer the aircraft through at least a first portion of the curved section. The first nose gear steering angle is selected to cause the nose gear of the aircraft to depart a taxiway centerline. The first nose gear steering angle is selected to keep a steering point of the aircraft substantially over the taxiway centerline as the aircraft traverses at least the first portion of the curved section.

The features, functions, and advantages that are described can be achieved independently in various embodiments or may be combined in yet other embodiments, further details of which are disclosed with reference to the following description and drawings.

DETAILED DESCRIPTION

Embodiments disclosed herein include methods, non-transitory computer-readable storage media, and aircraft to assist in steering aircraft on taxiways to maintain nose gear and main gear on a surface of a taxiway during turns. A steering point is identified along an aircraft centerline between the nose gear and the main gear. The steering point is used to determine a steering angle for the nose gear. The nose gear is oversteered so as to have the steering point follow a taxiway centerline rather than the nose gear following the taxiway centerline. Having the steering point substantially follow the taxiway centerline may permit the aircraft to perform a turn without any of the gear leaving the surface of the taxiway. In a particular embodiment, the turn may be divided into segments. The nose gear steering angle may be determined for each of the segments to maintain all the gear on the surface of the taxiway. The determined nose gear steering angle may be used to automatically direct the nose gear. Alternatively, the nose gear steering angle may be presented to an operator to assist the operator in properly oversteering the aircraft.

Figure 2:
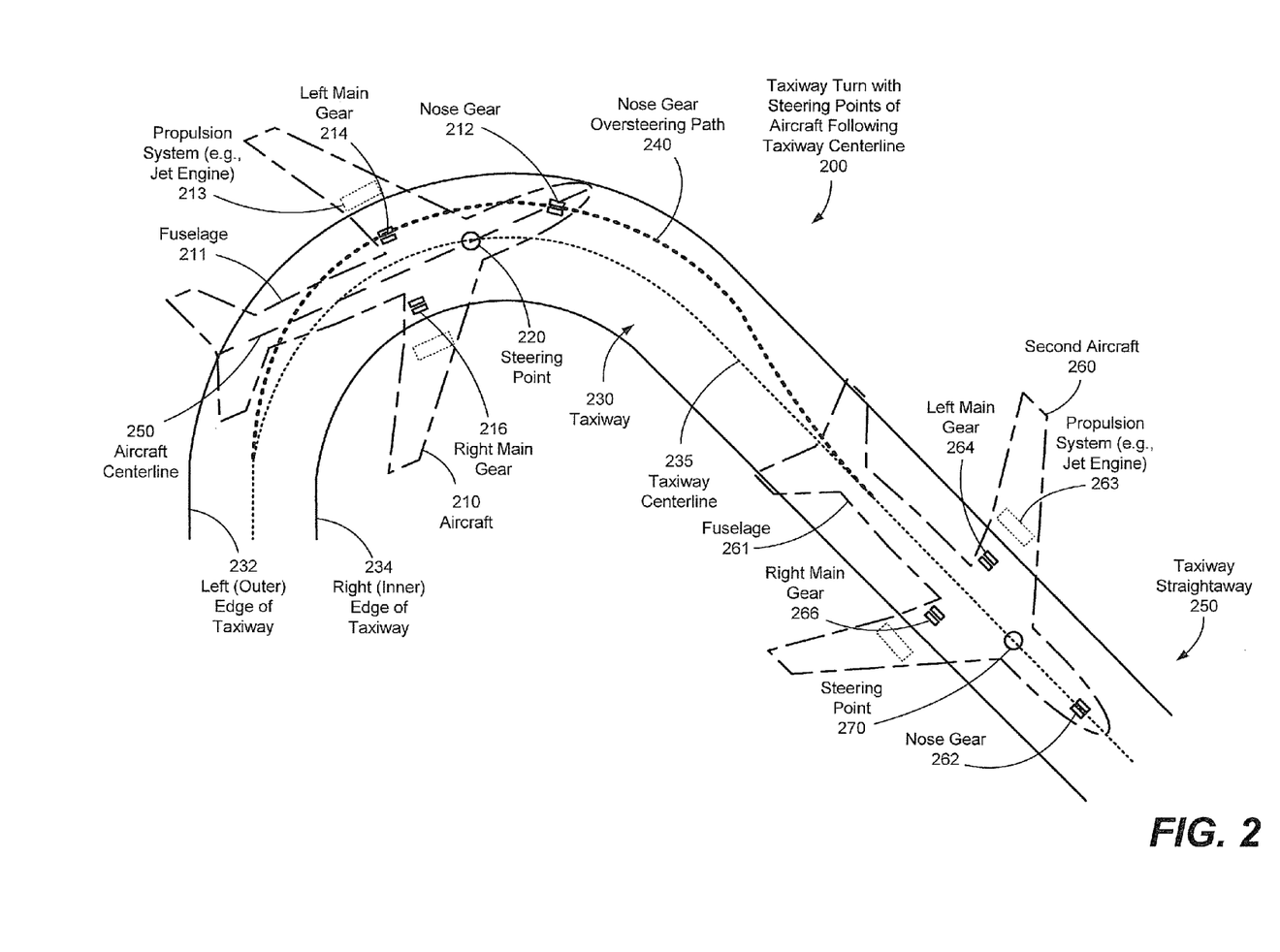
FIG. 2 is a diagram depicting an aircraft traversing the taxiway turn of FIG. 1 in which a steering point follows a taxiway centerline according to an embodiment of a steering method for taxiing aircraft.

FIG. 2 is a diagram depicting a first aircraft 210 and a second aircraft 260 traversing a taxiway turn 200. The taxiway turn 200 is similar to the taxiway turn 100 of FIG. 1. However, unlike the example of FIG. 1, the first aircraft 210 and the second aircraft 260 navigate the turn taxiway turn 200 by maintaining steering points 220 and 270, respectively, over the taxiway centerline 235 according to an embodiment of a steering method for taxiing aircraft. By contrast, in FIG. 1 the nose gear 112 follow the taxiway centerline 135, which may cause one of the main gear 114 and 116 to leave the surface of the taxiway 130.

The first aircraft 210 includes a fuselage 211 that supports nose gear 212, left main gear 214, and right main gear 216. The fuselage 211 also supports a propulsion system 213 that may include one or more jet engines. In the embodiment illustrated in FIG. 2, the nose gear 212 of the first aircraft 210 is steered away from the taxiway centerline 235. Instead, the nose gear 212 follows a nose gear oversteering path 240. The steering point 220 may be selected at a point between the nose gear 212 and the main gear 214 and 216. The steering point 220 is selected, as further described below, to identify an intermediate location to move along the taxiway centerline 235 to keep all the gear 212, 214, and 216 on the surface of the taxiway 230. The nose gear oversteering path 240 is a result of steering the first aircraft 210 through a plurality of segments of the taxiway turn 200 so as to advance the steering point 220 from one point on the taxiway centerline 235 to a next point on the taxiway centerline 235. By advancing the steering point 220 along the taxiway centerline 235, the right main gear 216 remain within the right (inner edge) 234 of the taxiway 230 in the taxiway turn 200 of FIG. 2. Maintaining the gear 212, 214, and 216 within the edges 232 and 234 of the taxiway 230 enables the first aircraft 210 to be turned on a primary surface of the taxiway 230 without having to include a fillet (such as the optional fillet 136 of FIG. 1) to provide a secondary surface to facilitate taxiing of the first aircraft 210.

Note that oversteering may only be warranted on a taxiway turn, such as taxiway turn 200. When a taxiway presents a straight course, both the nose gear and the steering point may advance along the taxiway centerline. Referring to FIG. 2, a second aircraft 260 follows a taxiway straight-away 250 beyond the taxiway turn 200. The second aircraft 260 includes a fuselage 261 that supports nose gear 262, left main gear 264, and right main gear 266. The fuselage 261 also supports a propulsion system 263 that may include one or more jet engines. On the taxiway straightaway 250, both the nose gear 262 and the steering point 270 of the second aircraft 260 follow the taxiway centerline 235 with all gear 262, 264, and 266 remaining on the surface of the taxiway 230.

Figure 3:
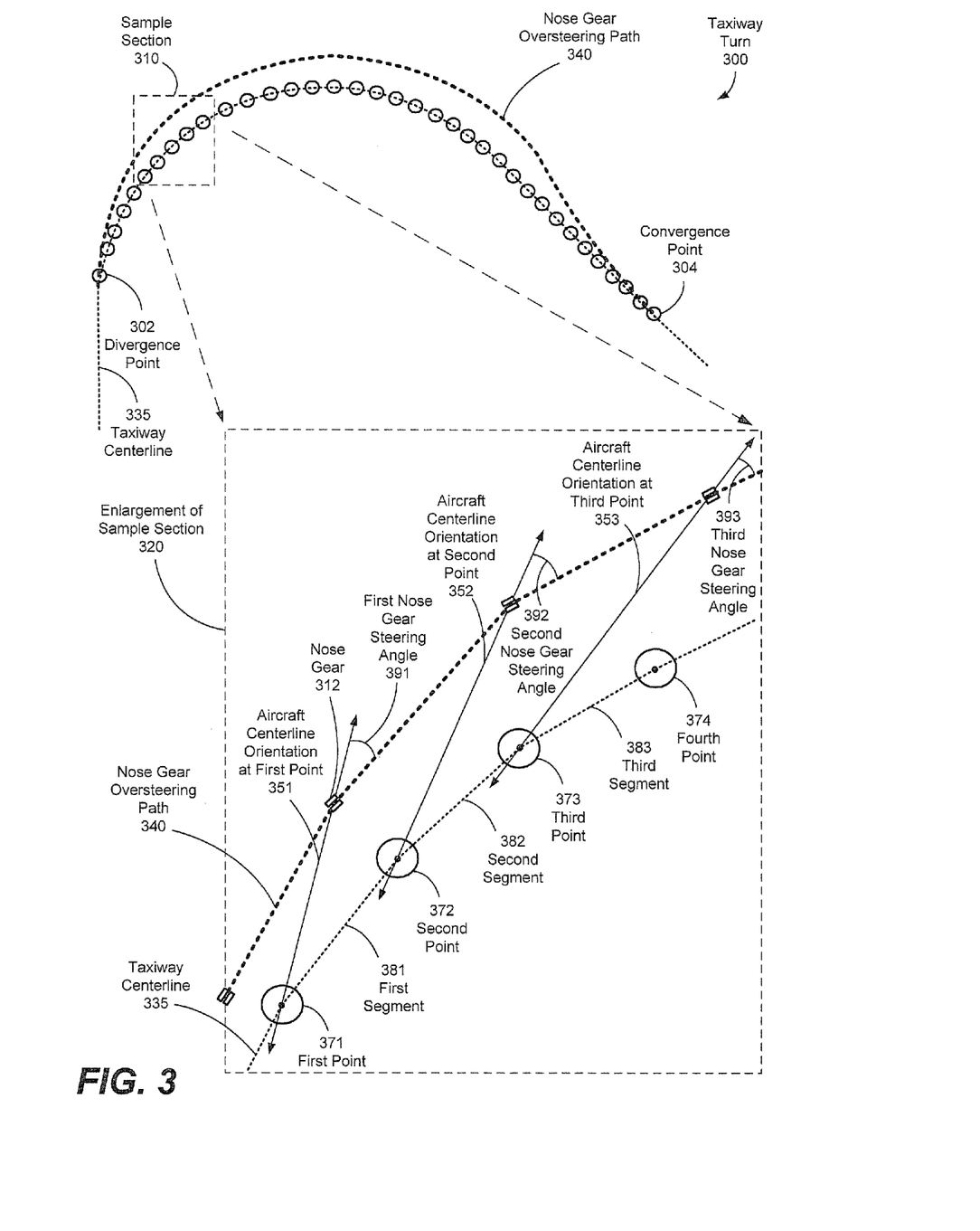
FIG. 3 is a diagram of a taxiway turn in which the taxiway centerline is regarded as a number of segments to determine nose gear steering angles according to an embodiment of a steering method for taxiing aircraft.

FIG. 3 is a diagram of a taxiway turn 300 in which a taxiway centerline 335 is regarded as a number of segments to determine nose gear steering angles 391-393 used to direct an aircraft along a nose gear oversteering path 340. The nose gear oversteering path 340 follows the taxiway centerline 135 when a taxiway follows a straight course, as was also shown in FIG. 2. However, at a start of the taxiway turn 300, according to a particular illustrative embodiment, there is a divergence point 302 at which the nose gear oversteering path 340 diverges from the taxiway centerline 335. At the divergence point 302, nose gear 312 may depart from the taxiway centerline 335. The nose gear 312 is oversteered to advance the steering point (periodically shown along the taxiway centerline 335 in stages as the first point 371, the second point 372, and the third point 373) along the taxiway centerline 335. The nose gear 312 follows the nose gear oversteering path 340 as the nose gear oversteering path 340 continues to diverge from the taxiway centerline 335. After the end of the taxiway turn 300, the nose gear oversteering path 340 converges toward the taxiway centerline 335 until reaching a convergence point 304.

According to a particular illustrative embodiment, the nose gear 312 is steered to maintain the steering point (again, periodically shown along the taxiway centerline 335 in stages as the first point 371, the second point 372, and the third point 373) of the aircraft over the taxiway centerline 335. Having the steering point track the taxiway centerline 335, as shown in FIG. 2, allows all gear 212, 214, and 216 to remain on the surface of the taxiway 230 throughout a process of navigating the taxiway turn 200. According to a particular illustrative embodiment, the nose gear oversteering path 340 may be determined by regarding the taxiway centerline 335 as a plurality of segments between points along the taxiway centerline 335. At each of the points, a nose gear steering angle is determined that may cause the steering point to move from one point on the taxiway centerline 335 to a next point along the taxiway centerline 335. A number of points 371-374 representing positions of the steering point along the taxiway centerline 335 and segments 381-383 connecting the points 371-374 are shown in an enlargement 320 of a sample section 310 of the taxiway turn 300 in FIG. 3.

In a particular illustrative embodiment, the plurality of segments 381-383 shown in the enlargement 320 of the sample section 310 connect adjacent points of the plurality of points 371-374 along the taxiway centerline 335. For ease of description, in FIG. 3, the aircraft is illustrated taxiing in the same direction as the aircraft 310 shown in FIGS. 1 and 2. A first point 371 (e.g., representing a first position of the steering point) is joined to a second point 372 (e.g., representing a second position of the steering point) by a first segment 381. The second point 372 is joined to a third point 373 by a second segment 382. The third point 373 is joined to a fourth point 374 by a third segment 383. At each of the points 371-373 at a start of one of the segments 381-383, a nose gear steering angle 391-393 is determined. The nose gear steering angle 391-393 is an angle at the nose gear 312 between a current orientation of an aircraft centerline 351-353 and the nose gear oversteering path 340. The nose gear steering angle 391-393 is selected to steer the aircraft so that the steering point advances to each of the next points 372-374, respectively, along the taxiway centerline 335.

For example, according to a particular illustrative embodiment, at the first point 371, a first nose gear steering angle 391 is determined for the nose gear that may advance the aircraft so that the steering point advances from the first point 371 along the first segment 381 to the second point 372. At the second point 372, a second nose gear steering angle 392 is determined that may advance the aircraft so that the steering point advances from the second point 372 along the second segment 382 to the third point 373. At the third point 373, a third nose gear steering angle 393 is determined that may advance the aircraft so that the steering point advances from the third point 373 along the third segment 383 to the fourth point 374. By dividing up the taxiway centerline 335 along the taxiway turn 300 into the plurality of points 371-374 connected by the segments 381-383, the aircraft may be steered through the taxiway turn 300 while maintaining all gear on the surface of the taxiway.

Figure 4:
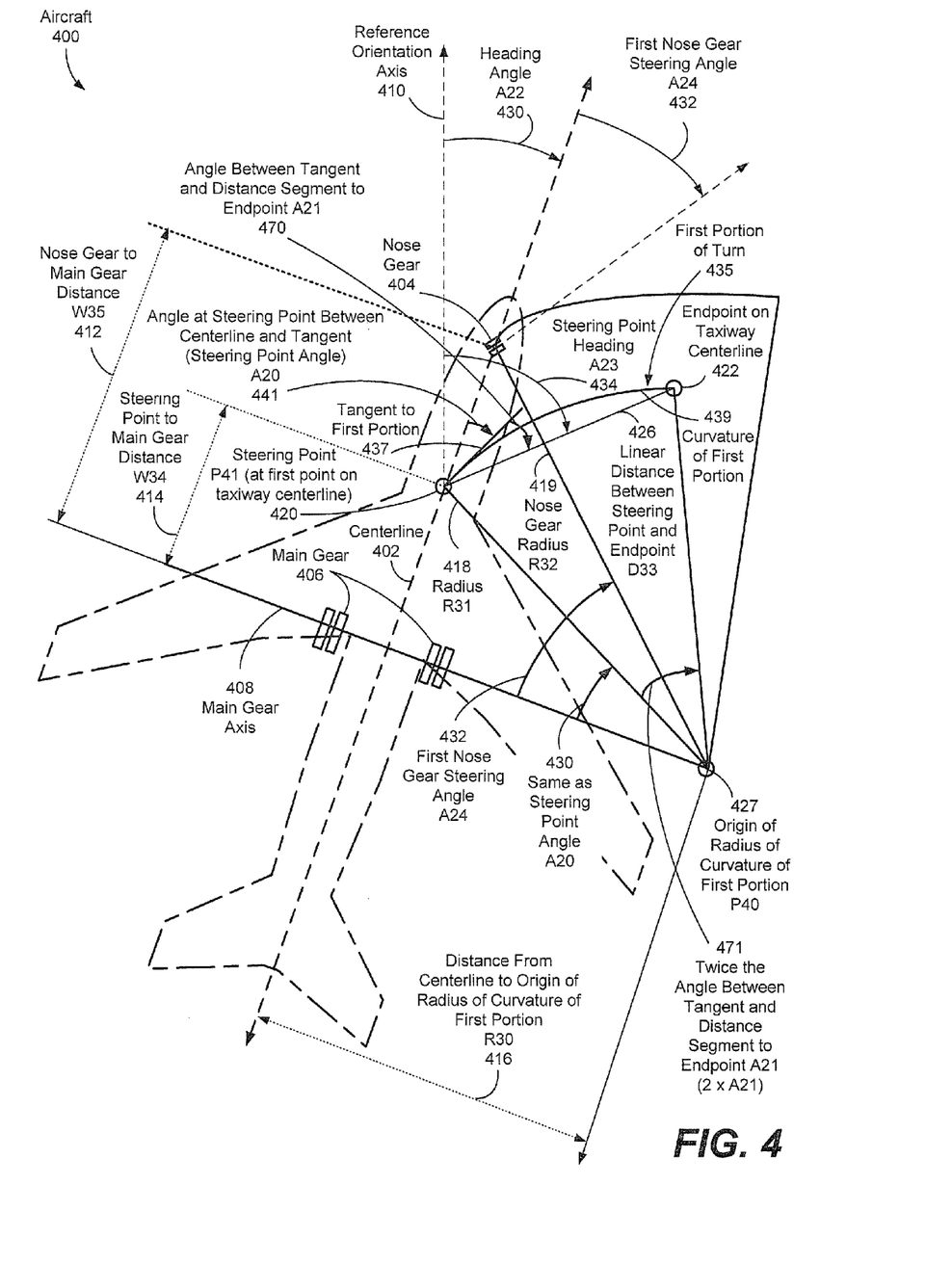
FIG. 4 is a diagram of the aircraft steering through a first portion of a turn to show distances and angles used to determine the nose gear steering angle at a point of a taxiway turn according to an embodiment of a steering method for a taxiing aircraft.

FIG. 4 is a diagram of an aircraft 400 steering through a first portion of a taxiway (not shown in FIG. 4). As explained with reference to FIG. 3, the taxiway centerline 335 may be regarded as a number of points joined by segments through which a steering point P41 420 passes. A nose steering angle may be determined for each of the points along the taxiway centerline 335. FIG. 4 illustrates distances and angles that may be used to determine a first nose gear steering angle A24 432 to steer the aircraft through a first portion of a turn 435. Completing the first portion of the turn 435 using the first nose gear steering angle A24 432 advances the steering point P41 420 through a curvature 439 of first portion of the turn 435 to an endpoint 422 on the taxiway centerline. The endpoint 422 is a linear distance D33 426 from the steering point P41 420 at a first or preceding point on the taxiway centerline. Determining a succession of nose gear steering angles from each point on the taxiway centerline to an endpoint of a next portion of the turn may enable nose gear 404 and main gear 406 to remain on a surface of the taxiway.

According to a particular illustrative embodiment, the steering point P41 420 may be a selected point along a centerline 402 of the aircraft 400. More specifically, the steering point P41 420 may be located at a point along the centerline 402 between nose gear 404 and a main gear axis 408. The location of the steering point P41 420 may be selected based on a distance between the nose gear 404 and the main gear 406, a distance between the centerline 402 of the aircraft 400 and the main gear 406, or a combination thereof, to account for the design of the aircraft 400. A distance along the centerline 402 between the nose gear 404 and the main gear axis 408 may be referred to as a nose gear to main gear distance W35 412. A distance along the centerline 402 between the steering point P41 420 and the main gear axis 408 may be referred to as a steering point to main gear distance W34 414. According to a particular embodiment, the steering point to main gear distance W34 414 may be selected according to an oversteering percentage X50 according to Eq. (1):

$$W34=W35*(1-X50/100) \qquad (1)$$

According to a particular illustrative embodiment, the oversteering percentage X50 may be selected randomly. According to another illustrative embodiment, the oversteering percentage X50 may be selected iteratively to determine an appropriate location for the steering point P41 420 based on the design of the particular aircraft.

According to a particular illustrative embodiment, based on the location for the steering point P41 420, geometry may be used to determine the first nose gear steering angle A24 432 to be used to advance the steering point P41 420 to each successive endpoint on the taxiway centerline 422. According to a particular embodiment, the first nose gear steering angle A24 432 is determined by iteratively solving a system of equations followed by solving another equation. The system of equations is solved until an angle A20 441 converges. The angle A20 441 is measured at the steering point P41 420 between the centerline 402 of the aircraft 400 and a tangent 437 to a curvature 439 of the first portion of the turn 435. The angle A20 441 may be regarded as a steering point angle as it describes an angle at which the steering point P41 420 is steered from an orientation of the centerline 402, as described with reference to FIG. 3. The steering point angle A20 441 is selected to maintain the steering point P41 420 over the taxiway centerline (not shown in FIG. 4). An equation is used to determine the first nose gear steering angle A24 432 using the angle A20 441.

According to a particular illustrative embodiment, the system of equations is based on three angles. A first angle is a steering point heading A23 434 measured at the steering point P41 420 between a reference orientation axis 410 and a line segment defining the linear distance D33 426 between the steering point P41 420 and the endpoint 422 of the first portion of the turn 435. A second angle is a heading angle A22 430 measured at the steering point P41 420 between the reference orientation axis 410 and the centerline 402 of the aircraft 400. A third angle A21 470 is measured at the steering point P41 420 between the tangent 437 and the line segment that defines the linear distance D33 426 between the steering point P41 420 and the endpoint 422.

The third angle A21 470 is one-half the angle 471 representing an angular movement of the steering point P41 420 to the endpoint 422 as measured at the origin of radius of curvature P40 427 of the first portion of the turn 435. In other words, the angle 471 measured at the origin of radius of curvature 427 is twice the size of the third angle A21 470 (i.e., 2×A21 470). Note that, as the steering point P41 420 moves through the curvature 439 of the first portion of the turn 435, initially the steering point P41 420 moves at an angle A21 470 directed away from the linear distance D33 426 between the steering point P41 420 and the endpoint D33 422. The steering point P41 420 then moves at an angle A21 470 directed toward the linear distance D33 426 as the steering point P41 420 approaches the endpoint 422, The first equation of the system of equations may be given by Eq. (2):

$$A20 = A23 - A22 - A21 \qquad (2)$$

In a particular embodiment, computation of the steering point angle A20 441 may be subject to a condition that the steering point angle A20 441 be greater than a quantity A20_TOL. The quantity A20_TOL may be a small, arbitrary non-zero quantity placing a limit on A20 441 to avoid a divide-by zero condition. For example, the divide-by-zero condition may result when the aircraft is traveling on a straight section of taxiway. The condition may be given by:

$$\text{abs}(A20) > A20\_TOL$$

When the condition is satisfied, then the remaining equations of the system of equations are solved. Otherwise, the nose gear 404 and the steering point P41 420 both may follow the taxiway centerline and all gear 404 and 406 may remain on the surface of the taxiway without nose gear oversteering.

According to a particular illustrative embodiment, the second equation of the system of equations may be based on three quantities. A first quantity is a length of a radius R31 418 between the steering point P41 420 and the origin 427 of the radius of curvature 439 of the first portion of the turn 435. A second quantity is the distance W34 414 from the steering point P41 420 to the main gear axis 408 along the centerline 402 of the aircraft 400. A third quantity is the sine of the steering point angle A20 441. The second equation of the system of equations may be given by Eq. (3):

$$R31 = W34/\sin(A20) \qquad (3)$$

According to a particular illustrative embodiment, the third equation of the system of equations may be based on three additional quantities. A first quantity is the angle A21 470 measured at the steering point P41 420 between the tangent 437 and the line segment that defines the linear distance D33 426 between the steering point P41 420 and the endpoint 422. A second quantity is the linear distance D33 426 between the steering point P41 420 and the endpoint 422. A third quantity is the length of a radius R31 418 between the steering point P41 420 and the origin 427 of the radius of curvature 439 of the first portion of the turn 435. The third equation of the system of equations may be given by Eq. (4):

$$A21 = \arcsin((D33/2)/R31) \qquad (4)$$

According to a particular illustrative embodiment, angle A21 is set to an initial estimate of zero. Then Eqs. 2, 3, and 4 may be iteratively solved (subject to the constraint of that abs(A20)>A20_TOL) until the value of the angle A20 441 generally converges. Written together, the system of equations may be represented by the pseudocode statements:

$$A20 = A23 - A22 - A21$$

if abs(A20)>A20_TOL $$R31 = W34/\sin(A20)$$

$$A21 = \arcsin((D33/2)/R31)$$

When the steering point angle A20 441 generally converges, the first nose gear steering angle A24 432 may be determined from another equation. This equation may determine the first nose gear steering angle A24 432 from the steering point to main gear distance W34 414, the nose gear to main gear steering distance W35 412 and the steering point angle A20 441 from the system of equations.

$$A24 = \arctan((W35/W34)*\tan(A20)) \qquad (5)$$

According to a particular illustrative embodiment, when the steering point P41 420 of the aircraft 400 reaches a position proximate to the endpoint 422, the process described above may be repeated to advance the steering point P41 420 to a next endpoint. According to a particular illustrative embodiment, a location of each next endpoint and, thus, a linear distance D33 between the steering point P41 420 and the next endpoint may be selected to be small enough to present a nose gear oversteering path that maintains all of the gear 404 and 406 on a surface of the taxiway. According to another particular illustrative embodiment, the linear distance D33 426 may be selected to be large enough to result in a reasonable processing load in performing the calculations for the nose gear steering angle A24 432.

Figure 5:
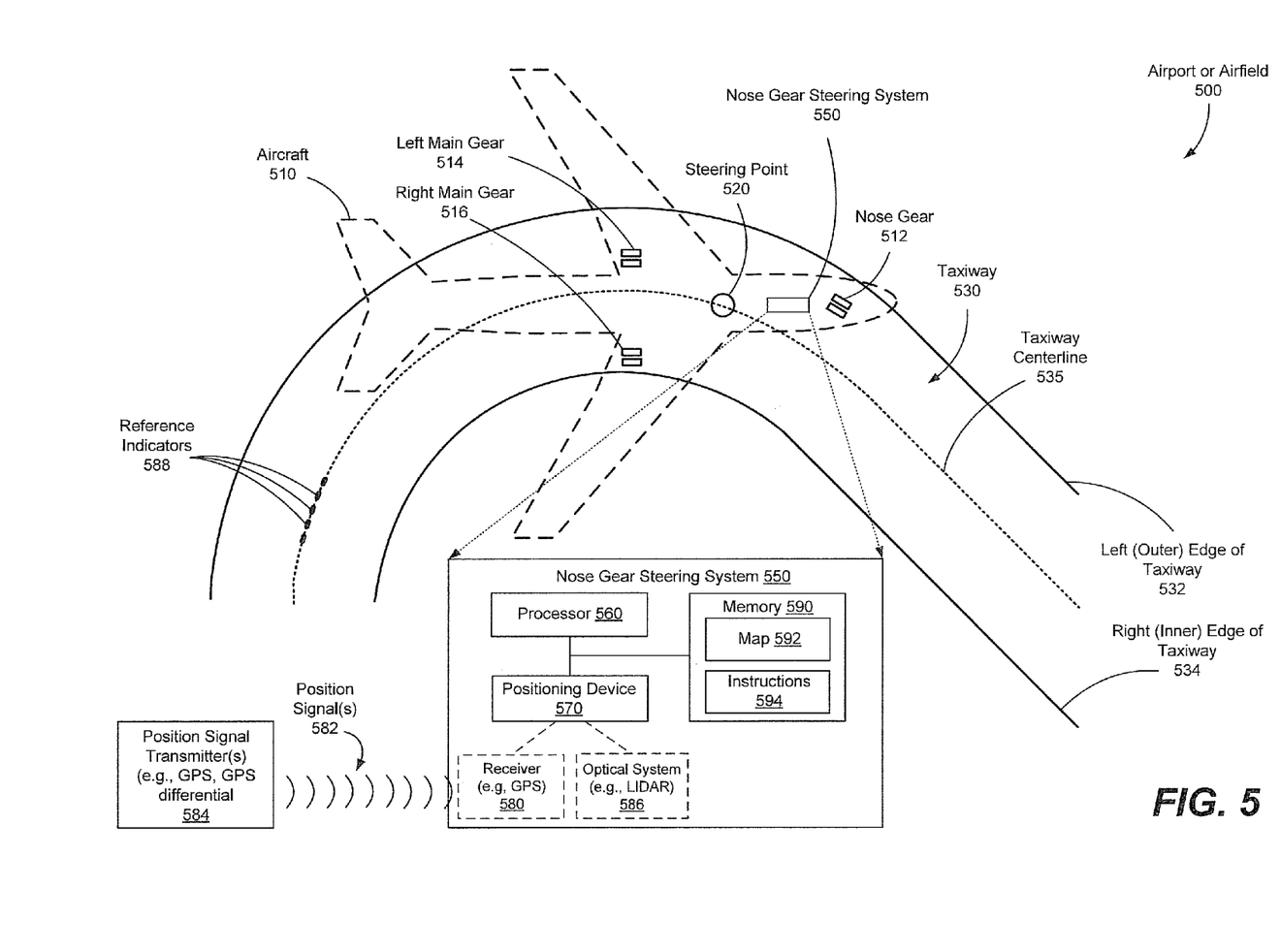
FIG. 5 is a block diagram of an airport or airfield at which an aircraft uses a nose gear steering systems according to an embodiment of a steering method for taxiing aircraft.

FIG. 5 is a block diagram of an airport or airfield 500 where an aircraft 510 uses a nose gear steering system 550 according to a particular illustrated embodiment. The nose gear steering system 550 may be carried aboard the aircraft 510. According to a particular illustrative embodiment, the nose gear steering system 550 may include a processor 560, a positioning device 570, and a memory 590. The processor 560, the positioning device 570, and the memory 590 are operably coupled so as to be in communication with each other.

The positioning device 570 determines a position of the aircraft relative to the taxiway. According to a particular illustrative embodiment, the positioning device 570 may include a receiver 580 configured to receive one or more position signals 582 from one or more position signal transmitters 584. According to one particular illustrative embodiment, the position signal transmitters 584 may include global positioning system (GPS) satellites. According to another particular illustrative embodiment, the position signal transmitters 584 also may include GPS satellites and a GPS difference signal source (not shown in FIG. 5) deployed at the airport 500 to provide an offset to GPS signals received from the GPS satellites to correct deviations in the GPS signals received at the airport 500 and to improve the accuracy of information obtained from the GPS system. According to another particular illustrative embodiment, the one or more position signal transmitters 584 may include other systems that provide the one or more position signals 582.

According to another particular illustrative embodiment, the positioning device 570, alternatively or in addition to including the receiver 580, may include an optical system 586. In one particular illustrative embodiment, the optical system 586 may include a Laser Imaging Detection and Ranging (LIDAR) system, or another system to assist in precisely identifying the position of the aircraft 510 relative to the taxiway 530. An optical system 586, such as a LIDAR system or similar system, may be configured to precisely determine a position of the aircraft relative to reference indicators 588. The reference indicators 588 may include markings along the taxiway centerline 535 or other reference points positioned on or around the taxiway 530 and the airfield 500. The markings may be detectible in a visible light spectrum or in other spectra. The reference indicators 588 may be visually detectable or non-visually detectable. The reference indicators 588 provide points of reference to assist in providing aircraft with precise positioning data.

According to a particular illustrative embodiment, the memory 590 may include a map 592 of the airport 500 that, for example, presents a layout of a taxiway 530 or a plurality of taxiways at the airport 500. The map 592 may be compared with the position data from the positioning device 570 to enable the nose gear steering system 550 to determine the position of the aircraft 510 in relation to the taxiway 530. The memory 590 also may include instructions 594 executable by the processor 570 to perform calculations to enable an embodiment of a steering method for taxiing aircraft. For example, the instructions 594 may include instructions to determine a nose gear steering angle as described with reference to FIG. 4.

As the aircraft 510 moves along the taxiway 530, the nose gear steering system 550 receives the one or more position signals 584 or processes other positioning data used by the positioning device 570. According to a particular illustrative embodiment, the nose gear steering system 550 may compare the positioning information determined by the positioning device 570 with the map 592 to determine the position of the aircraft 510 relative to the taxiway 530. In one particular embodiment, the nose gear steering system 550 may compare a position of the steering point 520 with the taxiway centerline 535 to direct the nose gear 512 to steer the aircraft 510. In another particular embodiment, the nose gear steering system 550 calculates a nose gear steering angle to maintain the left main gear 514 within the left edge 532 of the taxiway 530 (an outer edge of the taxiway in a right-hand turn as shown in FIG. 5) and to maintain the right main gear 516 within the right (inner) edge 534 of the taxiway 530. For example, in yet another particular embodiment, the nose gear steering system 550 may determine the nose gear steering angle using the equations described with reference to FIG. 4.

According to a particular illustrative embodiment, the nose gear steering angle calculated by the nose gear steering system 550 may be provided directly to a nose gear steering apparatus to automatically steer the aircraft 510. Alternatively, in yet another particular embodiment, the nose gear steering angle calculated by the nose gear steering system 550 may be provided to an operator (not shown in FIG. 5) of the aircraft 510 to enable the operator to oversteer the nose gear 512 of the aircraft 510 to maintain the left main gear 514 and the right main gear 516 within the edges 532 and 534 of the taxiway 530.

Figure 6:
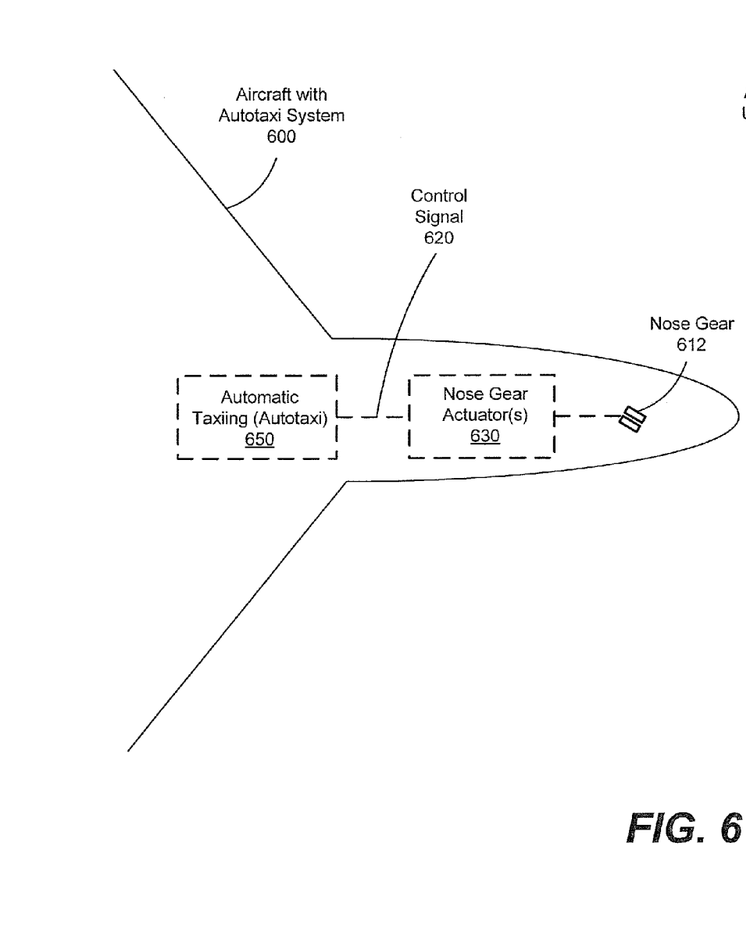
FIGS. 6 and 7 are block diagrams of nose gear steering systems according to particular embodiments.

FIG. 6 is a block diagram of an aircraft 600 with an automatic taxiing (autotaxi) system 650 aboard. The automatic taxiing system 650 aboard the aircraft 600 is a particular embodiment of the nose gear steering system 550 of FIG. 5. The automatic taxiing system 650 generates a control signal 620. The control signal 620 may be communicated to nose gear actuators 630 that drive the nose gear 612 of the aircraft 600. The aircraft 600 may taxi automatically while maintaining all gear on the surface of the taxiway.

Figure 7:
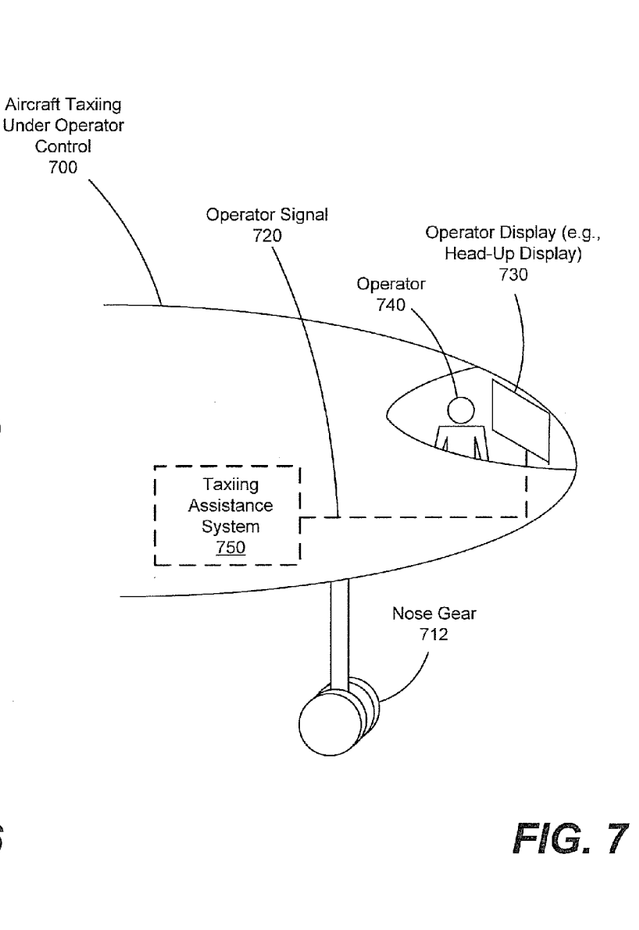

FIG. 7 is a block diagram of an aircraft 700 with a taxiing assistance system 750 aboard. The taxiing assistance system 750 about the aircraft 700 is equipped is another particular embodiment of the nose gear steering system 550 of FIG. 5. The taxiing assistance system 750 that generates an operator signal 720. According to a particular illustrative embodiment, the operator signal 720 may be communicated to an operator display 730, such as a head-up display used by an operator 740. In other particular embodiments, the operator signal 720 may be provided to the operator 740 via other devices (not shown in FIG. 7) as other visual cues or as audible or tactile cues. Thus, the operator 740 may be able to oversteer the nose gear 712 in response to the operator signal 720 shown on the operator display 730 to maintain all gear on the surface of the taxiway. With the operator signal 720 providing the appropriate steering angle to the operator 740 via the operator display 730, the operator 740 may not have to estimate the oversteering angle to try to keep all gear on a surface of the taxiway. Instead, by following cues provided by the operator display 730 from the taxiing assistance system 750, the operator 740 can properly steer the aircraft 700 without guesswork or potential mishaps that may result from incorrect steering decisions.

Figure 8:
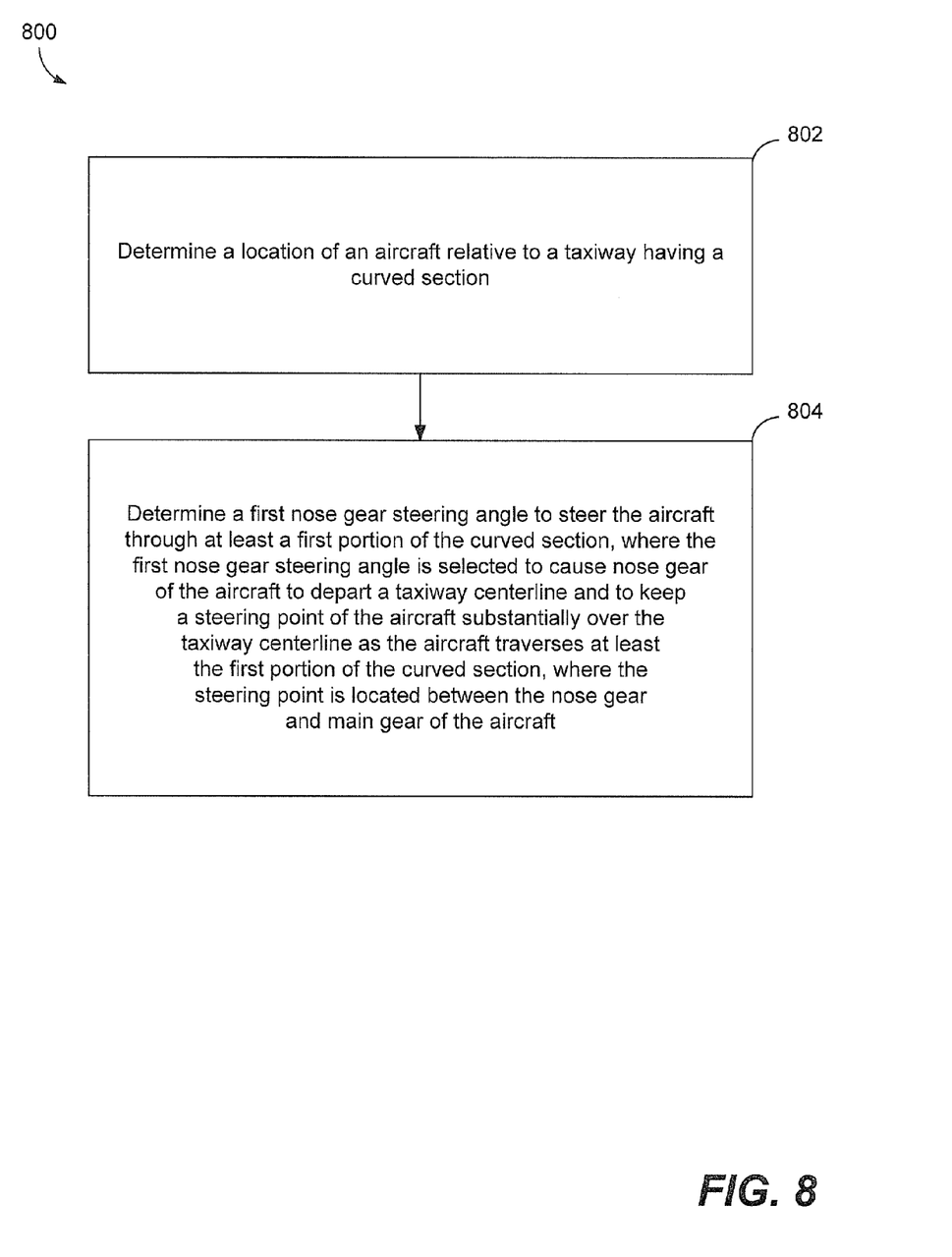
FIG. 8 is a flow chart of an embodiment of a steering method for taxiing aircraft.

FIG. 8 is a flow chart of a particular embodiment of a steering method 800 for taxiing aircraft. In a particular illustrative embodiment, the method 800 may be performed by a nose gear steering system, such as the nose gear steering system 550 of FIG. 5, aboard an aircraft. Alternatively, according to another particular illustrative embodiment, appropriate nose gear oversteering may be determined using the method 800 off board the aircraft and communicated to the aircraft.

According to a particular illustrative embodiment, a location of the aircraft relative to a taxiway having a curved section is determined, at 802. For example, as described with reference to FIG. 5, the location of the aircraft may be determined by receiving one or more position signals 582 from one or more position signal transmitters 584 and comparing position information determined from the one or more position signals 582 with the map 592 stored in the memory 590. A first nose gear steering angle is determined to steer the aircraft through at least a first portion of the curved section, at 804. The first nose gear steering angle is selected to cause nose gear of the aircraft to depart a taxiway centerline. The first nose gear steering angle is selected to keep a steering point of the aircraft substantially over the taxiway centerline as the aircraft traverses at least the first portion of the curved section. The steering point, as explained above with reference to FIGS. 2-4, may be located between the nose gear and main gear of the aircraft.

Figure 9:
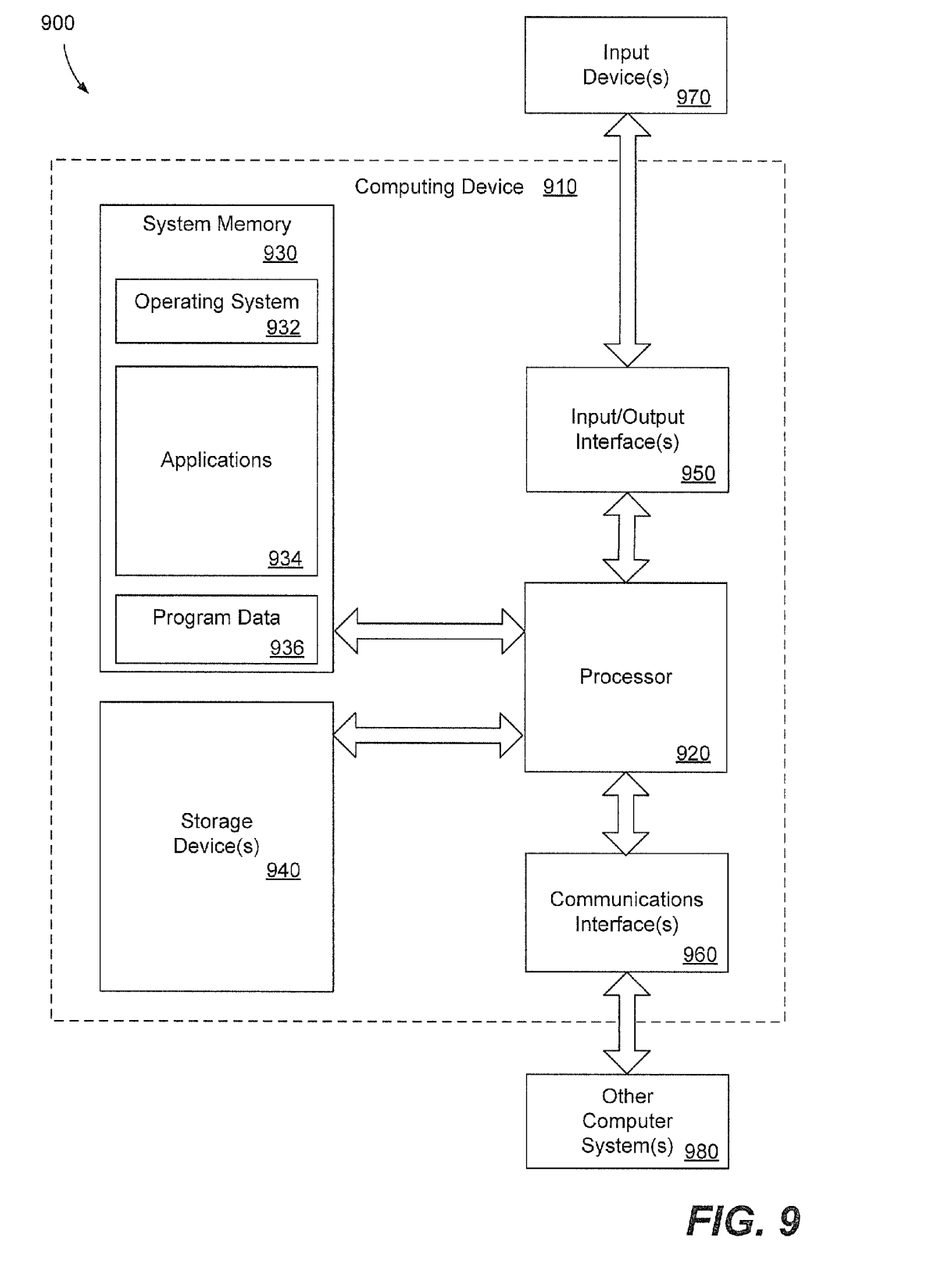
FIG. 9 is a block diagram of a general purpose computer system operable to perform computer-implemented methods or process computer-executable instructions of an embodiment of a steering method for taxiing aircraft.

FIG. 9 is a block diagram of a general purpose computer system operable to perform computer-implemented methods or process computer-executable instructions of an embodiment of a method for taxiing aircraft. According to a particular illustrative embodiment, the computer system 900 may be positioned aboard a vehicle, such as an aircraft, as described with reference to FIGS. 5-7. In an illustrative embodiment, a computing device 910 may include at least one processor 920. According to one particular illustrative embodiment, as described with reference to FIG. 6, the processor 920 may be configured to execute instructions to implement a method of automatically oversteering nose gear. According to another particular illustrative embodiment, as described with reference to FIG. 7, the processor 920 may provide nose gear oversteering cues to maintain an aircraft on a surface of a taxiway. The processor 920 may communicate with a system memory 930, one or more storage devices 940, and one or more input devices 970 via input/output interfaces 950. According to one particular illustrative embodiment, the one or more input devices 970 may include one or more positioning devices 570, such as the receiver 580 or the optical system 586 of FIG. 5. The processor 920, via one or more receivers or other communications interfaces 960 also may receive position signals 582 (FIG. 5) or otherwise communicate with one or more other computer systems 980 or other devices.

The system memory 930 may include nontransitory memory devices, including volatile memory devices, such as random access memory (RAM) devices, and nonvolatile memory devices, such as read-only memory (ROM), programmable read-only memory, and flash memory. According to a particular illustrative embodiment, the system memory 930 may include an operating system 932, which may include a basic/input output system for booting the computing device 910 as well as a full operating system to enable the computing device 910 to interact with users, other programs, and other devices. According to another particular illustrative embodiment, the system memory 930 may also include one or more application programs 934, such as instructions for configuring the computing system 910 to oversteer the aircraft or a map to assist in determining the position of the aircraft relative to a taxiway, as previously described.

The processor 920 also may communicate with one or more storage devices 940. According to a particular illustrative embodiment, the storage devices 940 may include nonvolatile storage devices, such as magnetic disks, optical disks, or flash memory devices. According to another particular illustrative embodiment, the storage devices 940 may be configured to store the operating system 932, the applications 934, the program data 936, or any combination thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A method, comprising:
   determining, at a device, a location of an aircraft relative to a taxiway having a curved section; and
   determining, at the device, a first nose gear steering angle to steer the aircraft through at least a first portion of the curved section,
      wherein the first nose gear steering angle is selected to cause nose gear of the aircraft to depart a taxiway centerline and to keep a steering point of the aircraft substantially over the taxiway centerline as the aircraft traverses at least the first portion of the curved section,
      wherein the steering point is located between the nose gear and main gear of the aircraft, and
      wherein the steering point is located on a centerline of the aircraft.

2. The method of claim 1, wherein the steering point is selected based on a distance between the nose gear and the main gear, a distance between the centerline of the aircraft and the main gear, or any combination thereof.

3. The method of claim 2, wherein the steering angle is determined based at least in part on:
   a radius of curvature of the first portion;
   a linear distance from the steering point to an endpoint of the first portion;
   a first distance along the centerline of the aircraft from the main gear to the steering point;
   a second distance along the centerline of the aircraft from the main gear to the nose gear; and
   a third distance along a main gear axis between an origin of a radius of curvature of the first portion and the centerline of the aircraft.

4. The method of claim 3, further comprising:
   automatically selecting, by the device, the endpoint of the first portion, wherein the endpoint is on the centerline of the taxiway; and
   automatically determining, by the device, the radius of curvature of the first portion and a position of the origin of the radius of curvature.

5. The method of claim 4, further comprising estimating a first angle between a line tangent to a curve of the first portion at the steering point based on the radius of curvature and a straight line from the steering point to the endpoint, the linear distance to the endpoint, and the first distance.

6. The method of claim 5, further comprising determining a second angle between the centerline of the aircraft and the line tangent to the curve of the first portion based on the estimated first angle.

7. The method of claim 6, further comprising determining the steering angle based on the second angle, the first distance, and a fourth distance from the centerline of the aircraft at the point perpendicular to the axis of the main gear to the origin of the radius of curvature of the first portion.

8. The method of claim 1, further comprising selecting a second portion of the curve in response to determining that the steering point is proximate to an endpoint of the first portion.

9. The method of claim 8, further comprising determining a second steering angle to maintain the steering point over the centerline of the taxiway through the second portion.

10. The method of claim 1, wherein determining the location of the aircraft relative to the taxiway includes one or more of:
    receiving a signal indicating a position of the aircraft and comparing the position of the aircraft to an electronic map of the taxiway; and
    determining, by the device, the location of the aircraft relative to a plurality of reference indicators using at least one of an optical and a Laser Imaging Detection and Ranging (LIDAR) system.

11. The method of claim 1, further comprising automatically positioning, by the device, the nose gear at the steering angle.

12. The method of claim 1, further comprising generating an operator signal that provides information to an operator of the aircraft to enable the operator of the aircraft to adjust and position the nose gear to the steering angle.

13. The method of claim 12, further comprising displaying the operator signal to the operator of the aircraft via a head-up display of the aircraft.

14. The method of claim 1, wherein the steering angle is selected to cause the main gear to remain within a primary taxiing surface of the taxiway while the aircraft traverses the curved section.

15. The method of claim 1, wherein no portion of the main gear enters a fillet of the taxiway when the aircraft is steered through the curve based on the steering angle.

* * * * *